(12) United States Patent
Sogawa et al.

(10) Patent No.: US 10,989,265 B2
(45) Date of Patent: Apr. 27, 2021

(54) VIBRATION DAMPING DEVICE OF INVERTED STRUCTURE

(71) Applicant: HONDA MOTOR CO., LTD., Tokyo (JP)

(72) Inventors: Naoki Sogawa, Wako (JP); Kentaro Komori, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 16/506,128

(22) Filed: Jul. 9, 2019

(65) Prior Publication Data

US 2020/0018375 A1 Jan. 16, 2020

(30) Foreign Application Priority Data

Jul. 10, 2018 (JP) .............................. JP2018-130986

(51) Int. Cl.
  *F16F 9/36* (2006.01)
  *F16F 9/18* (2006.01)
  *F16F 9/32* (2006.01)
  *F16F 9/06* (2006.01)

(52) U.S. Cl.
  CPC ................ *F16F 9/18* (2013.01); *F16F 9/064* (2013.01); *F16F 9/3235* (2013.01); *F16F 9/366* (2013.01); *F16F 2222/12* (2013.01); *F16F 2224/02* (2013.01); *F16F 2224/04* (2013.01); *F16F 2232/08* (2013.01); *F16F 2234/02* (2013.01)

(58) Field of Classification Search
  CPC .......... F16F 9/064; F16F 9/3236; F16F 9/366; F16F 9/3257; F16F 9/3278; F16F 2230/04; F16F 9/3235; F16F 9/18; B60G 13/008
  See application file for complete search history.

(56) References Cited

U.S. PATENT DOCUMENTS

| 5,672,572 A | 9/1997 | Arai et al. | |
| 5,984,060 A * | 11/1999 | Clark | B60G 3/01 188/269 |
| 6,247,683 B1 * | 6/2001 | Hayakawa | B60G 17/002 267/64.11 |
| 2015/0203778 A1 * | 7/2015 | Iovine | C10M 129/76 508/519 |
| 2018/0187735 A1 * | 7/2018 | Witting | B62K 25/06 |

FOREIGN PATENT DOCUMENTS

| JP | H06-336592 A | 12/1994 |
| JP | 5308938 B2 | 10/2013 |
| JP | 2017-190870 A | 10/2017 |

* cited by examiner

*Primary Examiner* — Nicholas J Lane
(74) *Attorney, Agent, or Firm* — Rankin, Hill & Clark LLP

(57) ABSTRACT

A vibration damping device of an inverted structure includes a cylinder, a rod capable of protruding and retracting in the cylinder, an outer cylinder coupled to the rod and inserted over the outer periphery of the cylinder, and a bush slidably inserted between the outer cylinder and the cylinder. A gap between the outer cylinder and the cylinder is filled with lubricating oil. The bush contains polytetrafluoroethylene and perfluoro alkoxy alkane. The lubricating oil contains an organic molybdenum additive.

3 Claims, 6 Drawing Sheets

VIBRATION DAMPING DEVICE OF INVERTED STRUCTURE

BACKGROUND OF THE INVENTION

1. Field of the Invention

The present invention relates to a vibration damping device of an inverted structure.

2. Description of the Related Art

In a vibration damping device (a damping device) of an upright structure in the past, a rod reciprocating in a cylinder of the vibration damping device receives a lateral force applied to the vibration damping device. Therefore, the rod is easily distorted. However, if a rod diameter is increased to improve the rigidity of the rod, a frictional force generated in the vibration damping device increases and the reaction of the rod also increases. Accordingly, when the vibration damping device having the large rod diameter is applied for example to a damper of a vehicle or the like, riding comfort of the vehicle or the like is deteriorated because, for example, thrust from the damper increases. Therefore, it is difficult to achieve both of the damping property and the rigidity of the vibration damping device of the upright structure.

In order to solve such a problem, there is known a vibration damping device of an inverted structure in which the vibration damping device is inverted, an outer cylinder is inserted around a cylinder, the outer cylinder and a rod are coupled, and the rod is caused to reciprocate together with the outer cylinder. In the vibration damping device of the inverted structure, a lateral force can be received by the outer cylinder. Therefore, it is possible to realize high rigidity without increasing a rod diameter.

In the vibration damping device of the inverted structure, a frictional force easily increases in a bearing section between the cylinder and the outer cylinder compared with the vibration damping device of the upright structure in which the rod only protrudes and retracts in the cylinder. Further, since the vibration damping device of the inverted structure is limited to a monotube type, a repulsion force of a gas chamber increases compared with a vibration damping device of a twin-tube type. Oil on the inside of the vibration damping device of the inverted structure easily thermally expands because of such an increase in the repulsion force. When the vibration damping device is applied for example as a damper of a vehicle or the like, the increase in the repulsion force tends to be a cause of easy fluctuation in a vehicle height due to the influence of temperature.

There has been a demand for a vibration damping device of an inverted structure that solves factors of an increase in a frictional force due to such an inverted structure.

As a technique for reducing a frictional force of a vibration damping device, there are the following techniques.

Japanese Patent No. 5308938 discloses an invention that provides a plurality of oil seals in a vibration damping device of an inverted structure in order to prevent lubricating oil between a cylinder and an outer cylinder from dropping passing through an oil seal to be depleted and realize smooth relative movement of the cylinder and the outer cylinder.

Japanese Patent Application Laid-Open No. 2017-190870 discloses a technique for realizing an excellent low friction property by using, on a frictional sliding surface of a bush used in a bearing section, a resin composition containing polytetrafluoroethylene resin or the like.

Japanese Patent Application Laid-Open No. 2008-69858 discloses a lubricating oil composition containing, in a molybdenum amount, 50 to 2000 ppm of MoDTC having a $C_8$ to $C_{23}$ hydrocarbon group to realize an excellent low wear property and an excellent low friction property.

A reduction of friction of the vibration damping device has been examined as described above. However, friction is not considered to be sufficiently reduced in the vibration damping device of the inverted structure in which a frictional force easily increases.

SUMMARY OF THE INVENTION

Therefore, an object of the present invention is to provide a vibration damping device of an inverted structure having a low friction property.

The present inventors earnestly examined a technique for reducing a frictional force of the vibration damping device of the inverted structure. As a result, the present inventors found that, in the vibration damping device of the inverted structure, a half or more of the frictional force is generated in a bearing section between a cylinder and an outer cylinder and the frictional force generated in the vibration damping device of the inverted structure can be significantly reduced by reducing wear of the bearing section.

An invention according to claim 1 is a vibration damping device of an inverted structure including: a cylinder; a rod capable of protruding and retracting in the cylinder; an outer cylinder coupled to the rod and inserted over an outer periphery of the cylinder; and a bush slidably inserted between the outer cylinder and the cylinder. A gap between the outer cylinder and the cylinder is filled with lubricating oil. The bush contains polytetrafluoroethylene and perfluoro alkoxy alkane. The lubricating oil contains an organic molybdenum additive.

According to the present invention, it is possible to provide a vibration damping device of an inverted structure having a lower friction property.

DETAILED DESCRIPTION OF THE EMBODIMENTS

A vibration damping device of an inverted structure according to an embodiment of the present invention is explained. In the following explanation, an overall configuration of the vibration damping device is described and, thereafter, lubricating oil and a bush used in the vibration damping device are described.

The present invention is not limited to the embodiment explained below.

Configuration of the Vibration Damping Device

Figure 1:
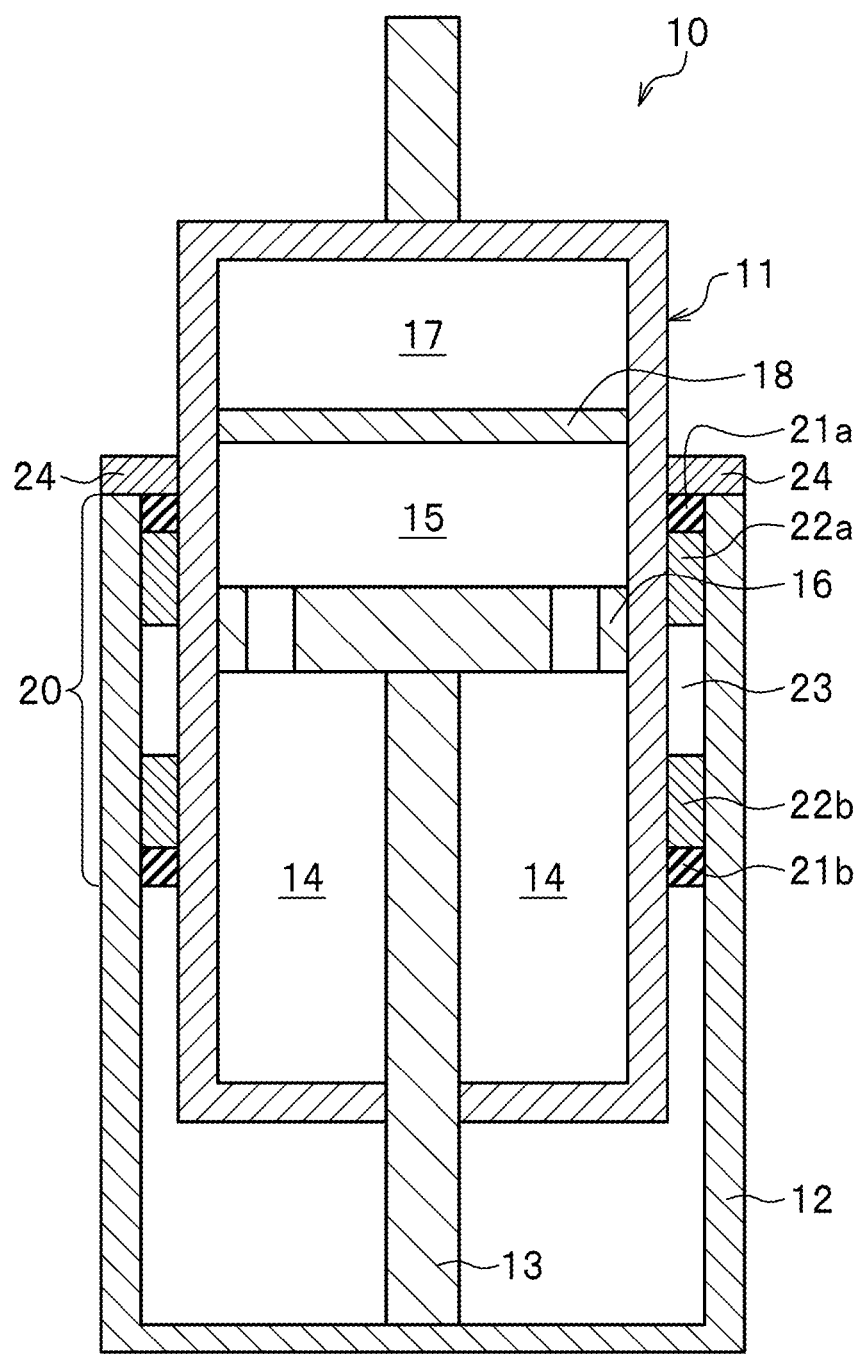
FIG. 1 is a sectional view showing a schematic configuration of a vibration damping device of an inverted structure.

FIG. 1 is a sectional view showing schematic structure of a vibration damping device 10 of an inverted structure according to the embodiment of the present invention. The vibration damping device 10 is a damper of an inverted structure of a monotube type (a de carbon type) mounted on a vehicle.

The vibration damping device 10 includes a substantially cylindrical cylinder 11 and a substantially cylindrical outer cylinder 12 inserted around the cylinder 11. Intra-cylinder oil is encapsulated in the cylinder 11. A rod 13 is inserted through the cylinder 11. The outer cylinder 12 is coupled to the rod 13. The outer cylinder 12 and the rod 13 integrally freely slide in the axial direction (the longitudinal direction) of the cylinder 11.

A piston 16 is attached to the distal end of the rod 13. The piston 16 divides the inside of the cylinder 11 into a first liquid chamber 14 and a second liquid chamber 15. The piston 16 includes a communication hole (a piston valve). The intra-cylinder oil passes through the communication hole to attenuate vibration received by the vibration damping device 10. A free piston 18 divides the inside of the cylinder 11 into the second liquid chamber 15 and a high-pressure gas chamber 17.

A bearing section 20 between the cylinder 11 and the outer cylinder 12 includes substantially ring-like oil seals 21 (an oil seal 21a and an oil seal 21b) in upper and lower parts of the bearing section 20. Lubricating oil 23 is sealed between the oil seal 21a on an upper side in a height direction and the oil seal 21b on a lower side in the height direction. A dust seal 24 is set on an upper edge of the cylinder 11 and the oil seal 21a to prevent dust from intruding into the outer cylinder 12.

Bushes 22 (a bush 22a and a bush 22b) are formed of a material having a low coefficient of friction and in a substantially cylindrical shape. The bushes 22 slidably hold the cylinder 11 between the oil seal 21a and the oil seal 21b.

Note that, although a plurality of bushes 22, that is, the bush 22a and the bush 22b are provided as an example in FIG. 1, one or more bushes 22 only have to be present. However, it is desirable to provide the plurality of bushes 22 as shown in FIG. 1. When only one bush 22a is provided, it is desirable to provide the bush 22a on the upper side in the height direction of the bearing section 20. Advantages of providing the plurality of bushes 22 and advantages of adjusting the positions of the bushes 22 are explained below in explanation about the bushes.

By adopting such a configuration, a lateral force applied to the vibration damping device 10 can be received by the outer cylinder 12. It is possible to improve the rigidity of the vibration damping device 10.

Figure 2:
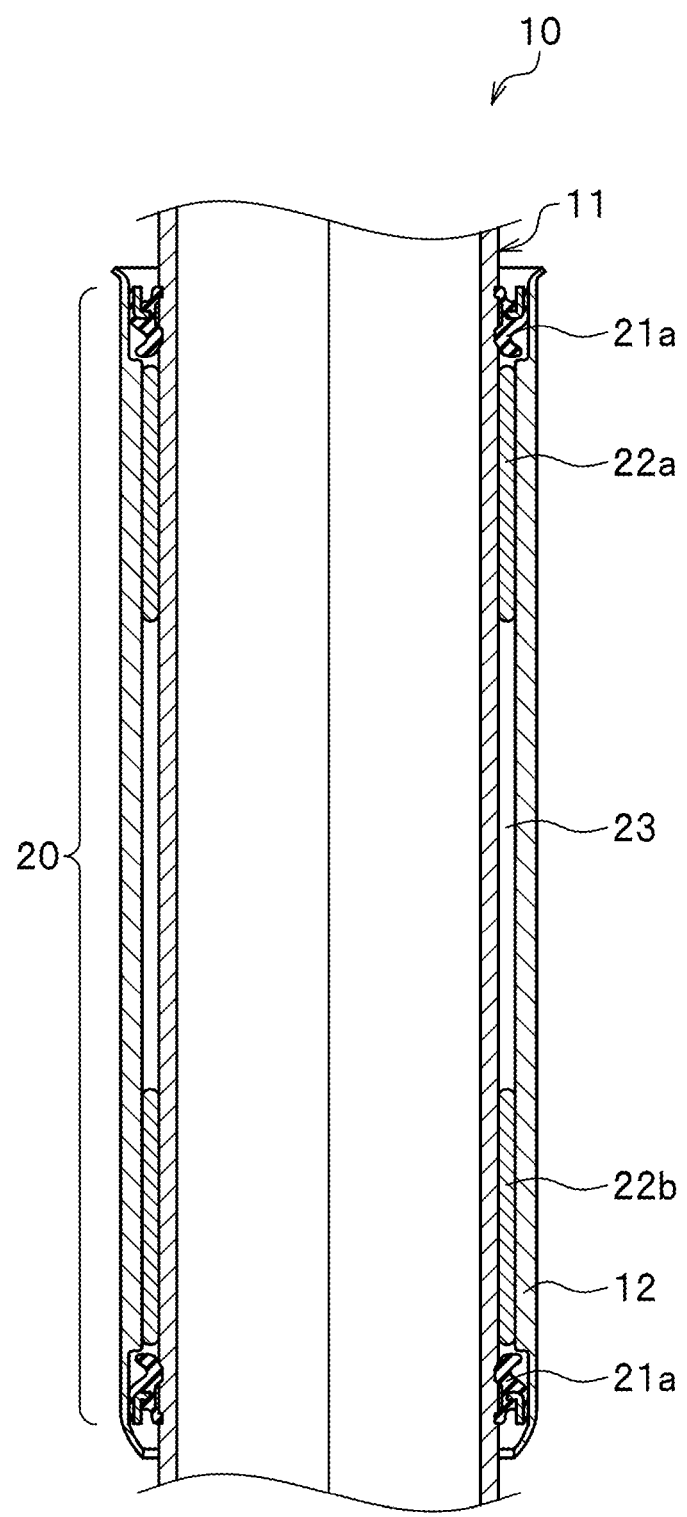
FIG. 2 is an enlarged sectional view of a bearing section of the vibration damping device of the inverted structure.

FIG. 2 is an enlarged sectional view of the bearing section 20 of the vibration damping device 10 according to the embodiment of the present invention. In FIG. 2, a scale in the length direction is different from the scale in FIG. 1. However, the bearing section 20 is the same in terms of structure in FIGS. 1 and 2.

The gap in the bearing section 20 between the cylinder 11 and the outer cylinder 12 is filled with the lubricating oil 23 to enable smooth sliding of the cylinder 11 and the outer cylinder 12.

Lubricating Oil

The present inventors examined a cause that increased a frictional force of the vibration damping device of the inverted structure. As explained above, the vibration damping device of the inverted structure is obtained by inverting the vibration damping device of the upright structure and inserting the outer cylinder around the cylinder. The present inventors performed a frictional force evaluation test under conditions of a frequency of 0.005 Hz and amplitude of ±5 mm about three kinds of existing thrust dampers used in an automobile: a thrust damper having only the upright structure, a thrust damper in which an outer cylinder and components involved in setting of the outer cylinder were added to the upright structure, and a thrust damper in which an outer cylinder and a dust seal and components involved in setting of the outer cylinder and the dust seal were added to the upright structure. As a result, a frictional force generated from the thrust damper having only the upright structure was 85.4 N, the frictional force increased by 122.6 N when the outer cylinder was added to the thrust cylinder, and the frictional force increased by 17.8 N when the dust seal was further added to the thrust cylinder. That is, it was found that 122.6 N, which is a half or more of a frictional force of 225.8 N of the entire vibration damping device of the inverted structure including the outer cylinder and the dust seal, was generated from the bearing section.

Accordingly, the present inventors further examined a reduction of a frictional force of the bush 22 and the lubricating oil 23 configuring the bearing section 20 in order to reduce the frictional force in the bearing section 20.

First, a reduction of friction of the lubricating oil 23 is described. The present inventors examined reducing friction of the lubricating oil 23 by containing an additive in the lubricating oil 23.

Figure 3:
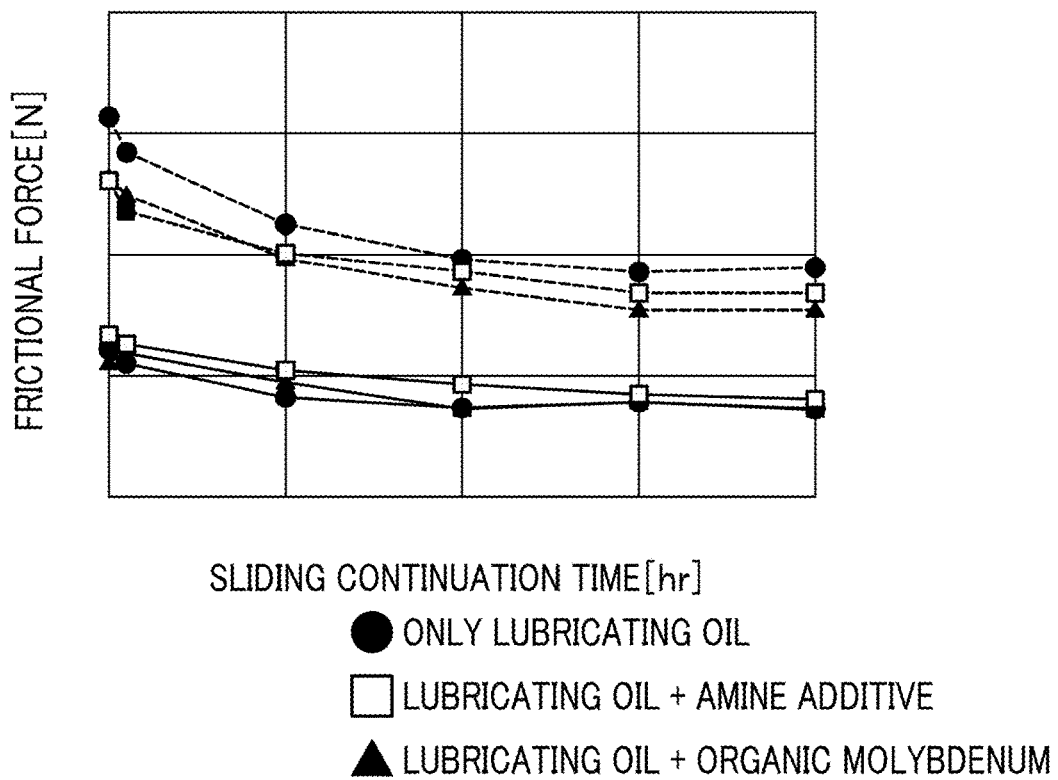
FIG. 3 is a graph showing the influence of a change of an additive on a frictional force of lubricating oil.
Figure 4:
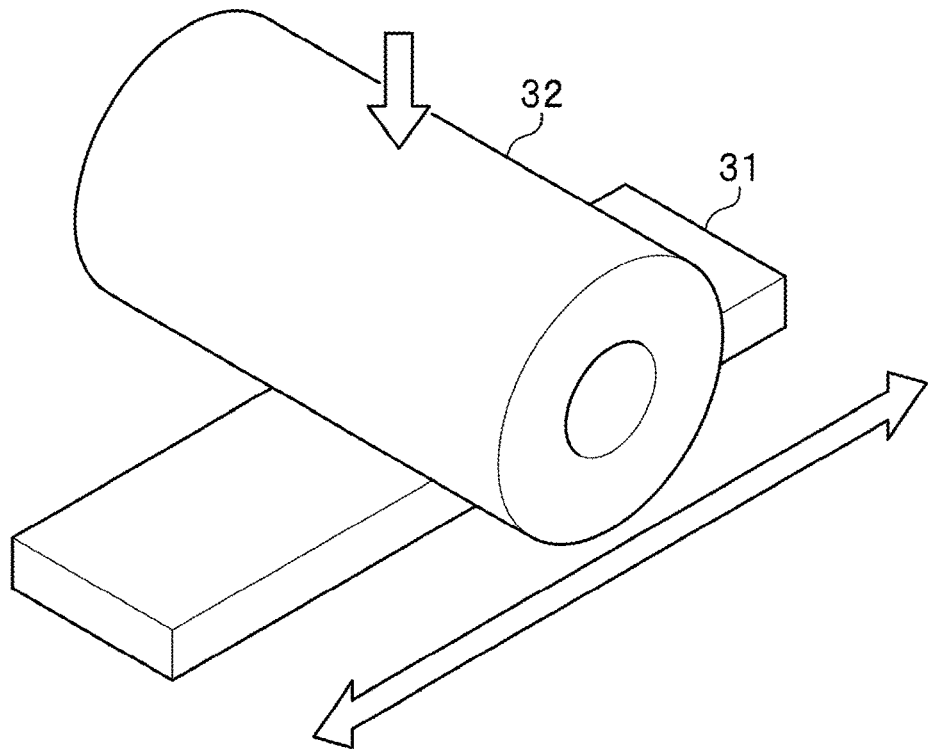
FIG. 4 is a schematic diagram of a device that measures the influence of the change of the additive on the frictional force of the lubricating oil.

A graph showing the influence of a change of the additive on a frictional force of the lubricating oil is shown in FIG. 3. A schematic diagram of a device that measures the influence of the change of the additive on the frictional force of the lubricating oil is shown in FIG. 4.

A specific evaluation method is as explained below.

Resin obtained by mixing 85 mass % of polytetrafluoroethylene (PTFE) and 15 mass % of perfluoro alkoxy alkane (PFA) is applied to the surface of tabular metal to form a guide metal 31. The guide metal 31 is immersed in a bath of approximately 21 ml of lubricating oil and a columnar rod 32 applied with chrome plating is placed on the guide metal 31 to manufacture a device for a frictional force evaluation. The rod 32 is the same as a piston rod of the existing vibration damping device of the inverted structure. In the device, a surface on which the guide metal 31 and the rod 32 frictionally slide is always present in the lubricating oil.

As the lubricating oil, three kinds of lubricating oils were prepared: lubricating oil including only the existing damper oil, lubricating oil obtained by adding the existing amine additive to the existing damper oil, and lubricating oil obtained by adding molybdenum dithiocarbamate (MoDTC) to the existing damper oil as an organic molybdenum additive. A device for three kinds of frictional force evaluation was manufactured.

The width of the guide metal 31 in the device for the frictional force evaluations is 10±1.5 mm.

In the device for the frictional force evaluations, a fixed load was applied to the rod 32 from up to down, that is, in a direction indicated by an arrow on the upper side in FIG. 4. The load is equivalent to a lateral force applied to the vibration damping device.

A state in which the load was applied was maintained. A frictional force generated when the guide metal 31 was continued to be caused to reciprocate (slide) in the longitudinal direction, that is, a direction indicated by an arrow on the lower side of FIG. 4 was measured in every one hour.

A movement amount of the sliding is set to, for example, ±10 mm centering on a start point and a frequency is set to, for example, 2 Hz (120 rpm/min). As an example, the measurement is performed respectively with a load of 24 N (a surface load of 9 MPa) and a load of 70 N (a surface load of 15 MPa).

In FIG. 3, the vertical axis indicates a frictional force and the horizontal axis indicates a sliding continuation time. A solid line indicates "data measured with the load of 24 N" and a dotted line indicates "data measured with the load of 70 N". A plot of a circle indicates data of the lubricating oil including only the existing damper oil. A plot of a square indicates data of the lubricating oil obtained by adding the amine additive to the existing damper oil. A plot of a triangle indicates data of the lubricating oil obtained by adding the organic molybdenum additive to the existing damper oil.

As it is seen from comparison of "data measured with the load of 24 N" and "data measured with the load of 70 N" in FIG. 3, the frictional force increases as the load increases. It is found from a result of FIG. 3 that the addition of molybdenum dithiocarbamate to the oil is poor in a reduction effect of the frictional force at the load of 24 N but significantly reduces the frictional force at the load of 70 N.

It is necessary to achieve a reduction of the frictional force under a high load with which the frictional force increases. Therefore, the lubricating oil 23 contains the organic molybdenum additive that significantly reduces the frictional force at the load 70 N.

A mechanism in which the frictional force reduction effect by molybdenum dithiocarbamate increases when the load increases is considered as explained below.

Molybdenum dithiocarbamate generates a surface film including molybdenum disulfide ($MoS_2$) according to an increase in pressure and load. Molybdenum disulfide has a layered crystal structure in which layers of molybdenum sandwiched by sulfur are stacked. Whereas bonding of molybdenum and sulfur is firm, bonding of sulfur connecting the layers is weak. The layers easily slip with a shearing force. Therefore, a coefficient of friction of molybdenum disulfide is low.

In this way, under the high load, molybdenum dithiocarbamate is considered to generate the surface film including molybdenum disulfide having the low coefficient of friction to reduce the frictional force.

Besides molybdenum dithiocarbamate, an organic molybdenum additive that exerts the same effect as the effect of molybdenum dithiocarbamate can be used as the additive of the lubricating oil. However, among various organic molybdenum additives, molybdenum dithiocarbamate is desirable because, for example, molybdenum dithiocarbamate does not include phosphorus (P) in a molecule and does not deteriorate durability.

The present inventors examined an optimum addition amount of the organic molybdenum additive that can reduce a frictional force of oil by being added to the oil.

Figure 5:
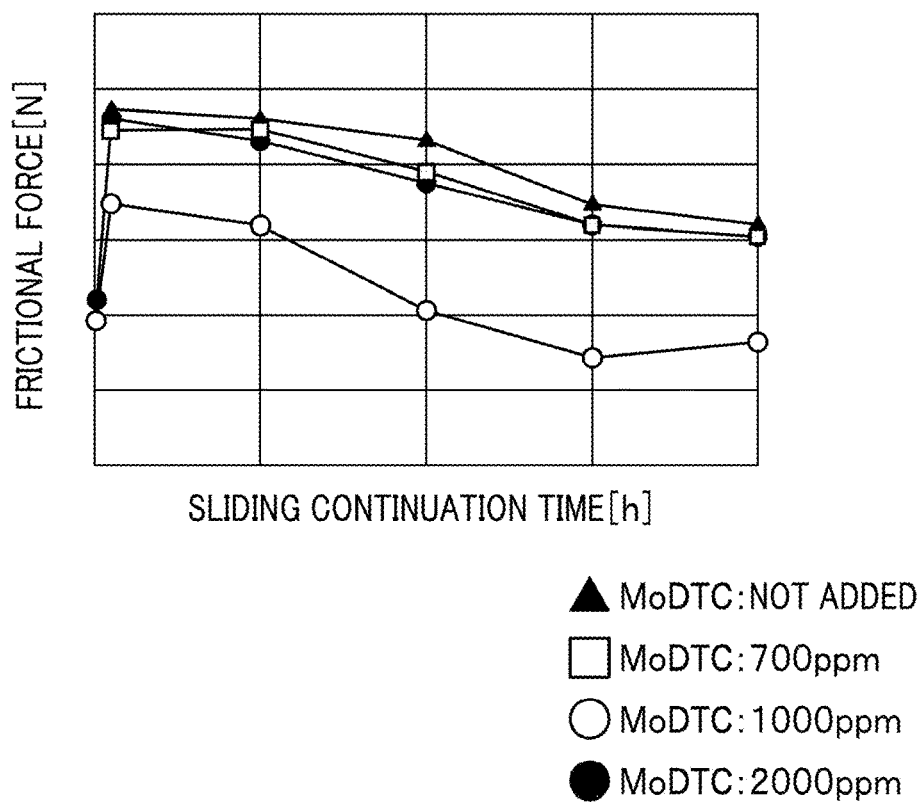
FIG. 5 is a graph showing the influence of a change of an addition amount of an organic molybdenum additive on the frictional force of the lubricating oil.

FIG. 5 is a graph showing the influence of a change of an addition amount of the organic molybdenum additive on a frictional force of the lubricating oil. In FIG. 5, the vertical axis indicates a frictional force and the horizontal axis indicates a sliding continuation time. A plot of a triangle indicates data of non-addition of the organic molybdenum additive, a plot of a square indicates data of addition of 700 ppm of the organic molybdenum additive, a plot of a white circle indicates data of addition of 1000 ppm of the organic molybdenum additive, and a plot of a black circle indicates data of addition of 2000 ppm of the organic molybdenum additive.

A specific measuring method is as explained below.

Molybdenum dithiocarbamate (MoDTC) was used as the organic molybdenum additive. MRF (Magneto-Rhological Fluid) oil (manufactured by LORD Corporation, model number 126CD) was used as the oil. As the lubricating oil, three kinds of lubricating oils were formed: lubricating oil including only 126CD, lubricating oil obtained by adding 700 ppm of MoDTC to 126CD, lubricating oil obtained by adding 1000 ppm of MoDTC to 126CD, and lubricating oil obtained by adding 2000 ppm of MoDTC to 126CD.

The four kinds of the lubricating oils were used to manufacture four kinds of the same test devices as the test device shown in FIG. 4. The measurement was performed by applying a load of 70 N with the same method as the measurement method shown in FIG. 4. From a result of the measurement, it is found that, when the organic molybdenum additive of 700 to 2000 ppm is added to the oil, the frictional force is further reduced than the oil not added with the organic molybdenum additive and, when the organic molybdenum additive of 1000 ppm is added, the frictional force is reduced most.

Consequently, the addition amount of the organic molybdenum additive to the lubricating oil 23 is preferably 700 to 2000 ppm and more preferably 900 to 1300 ppm.

Bush

A reduction of friction of the bush 22 is described.

The present inventors examined the influence of a material of the bush on a frictional force in the vibration damping device of the inverted structure.

Two kinds of bushes, that is, the existing bush containing 70 mass % of polytetrafluoroethylene (PTFE) and containing calcium fluoride ($CaF_2$) and ferric oxide ($Fe_2O_3$) as other main components and an improved bush containing 85 mass % of polytetrafluoroethylene and 15 mass % of perfluoro alkoxy alkane (PFA) were manufactured. Vibration damping devices of an inverted structure were manufactured using the respective bushes. As dimensions of the bushes, for example, an inner diameter is set to 40 mm, an outer diameter is set to 44 mm, and height is set to 20 mm.

The distance between the bushes of the vibration damping devices is set according to a design viewpoint such as a rod diameter and is set to, for example, 115 mm. Components other than the bushes of the vibration damping devices are the same.

A damper unit test was performed in order to compare frictional forces generated in the vibration damping devices. The damper unit test is a test for setting chucks above and below a damper, moving a piston rod up and down while applying a lateral force to the axial direction of the damper in the vertical direction, and measuring a frictional force generated from the damper. In the following explanation, the damper unit test means such a test method.

As an example, the damper unit test was performed on the respective vibration damping devices of the inverted structure under conditions of a frequency of 0.005 Hz, amplitude of ±5 mm, and lateral force ON. As a result of the measurement, a frictional force generated in the vibration damping device in which the existing bush was used was 208.9 N and a frictional force generated in the vibration damping device in which the improved bush was used was 199.9 N. It was found that the frictional force of the vibration damping device was reduced by approximately 9 N by the improved bush. Accordingly, the bush 22 configuring the bearing section 20 of the vibration damping device 10 of the inverted structure contains polytetrafluoroethylene and perfluoro alkoxy alkane.

If the frictional force can be reduced by the improvement of the lubricating oil 23 and the bush 22 in this way, it is considered possible to not only realize smooth sliding of the cylinder 11 and the outer cylinder 12 but also reduce wear of the bush 22.

In order to verify the reduction effect of wear of the bush 22 by the reduction of the frictional force, a bush having easiness of wear equivalent to easiness of wear of the existing bush and the improved bush were respectively immersed in an oil bath and set in contact with metal and a high load was applied to the bushes to perform a sliding test for four hours. After the sliding test, roughness of the surfaces of the bushes was measured using a contact-type surface roughness meter. The contact-type surface roughness meter is a meter that traces the surface of a sample with the tip of a contact needle of a detector and electrically detecting up-down movement of the contact needle. After the sliding test, a sliding surface and a non-sliding surface were compared and average wear depth was calculated. As a result, the average wear depth of the existing bush was 11 µm and the average wear depth of the improved bush was 4 µm. Improvement of wear resistance of the bush containing polytetrafluoroethylene and perfluoro alkoxy alkane was successfully confirmed.

In the vibration damping device in which the oil added with the organic molybdenum additive is used as the lubricating oil 23, the bush containing polytetrafluoroethylene and perfluoro alkoxy alkane is used as the bush 22, and the frictional force is reduced, wear of the bush less easily occurs. Therefore, in such a vibration damping device, a surface load of the bush can be increased. Therefore, it is possible to further reduce the frictional force by reducing a frictional sliding surface of the bush.

It is assumed that a plurality of bushes 22 are used in the bearing section 20. As shown in FIG. 3 referred to above, the frictional force changes according to the magnitude of the load (the lateral force). If the load applied to the bearing section 20 by the lateral force received by the vibration damping device 10 is different depending on a position in the up-down direction in the bearing section 20, a degree of wear of the bush 22 is considered to be different according to where in the bearing section 20 the bush 22 is located. In the bush 22 present in a position where the bush 22 less easily wears, it is possible to reduce the frictional sliding surface and further reduce the frictional force.

Therefore, the present inventors further examined adjustment of the sizes of the frictional sliding surfaces of the plurality of bushes 22 provided in the vibration damping device 10.

The present inventors manufactured a model of the vibration damping device 10 in which the bush 22a on the upper side in the height direction and the bush 22b on the lower side in the height direction were provided. Changes of surface loads received by the bush 22a and the bush 22b involved in a change of a load received by the vibration damping device 10 were respectively analyzed and compared by CAE (Computer Aided Engineering). Both of the measurement target bushes 22a and 22b are set in a substantially cylindrical shape. As the dimensions of the bushes 22a and 22b, for example, an inner diameter is set to 40 mm, an outer diameter is set to 44 mm, and height is set to 20 mm. The distance between the bushes of the vibration damping device 10 is set to, for example, 115 mm. A result of the measurement is explained below.

Figure 6:
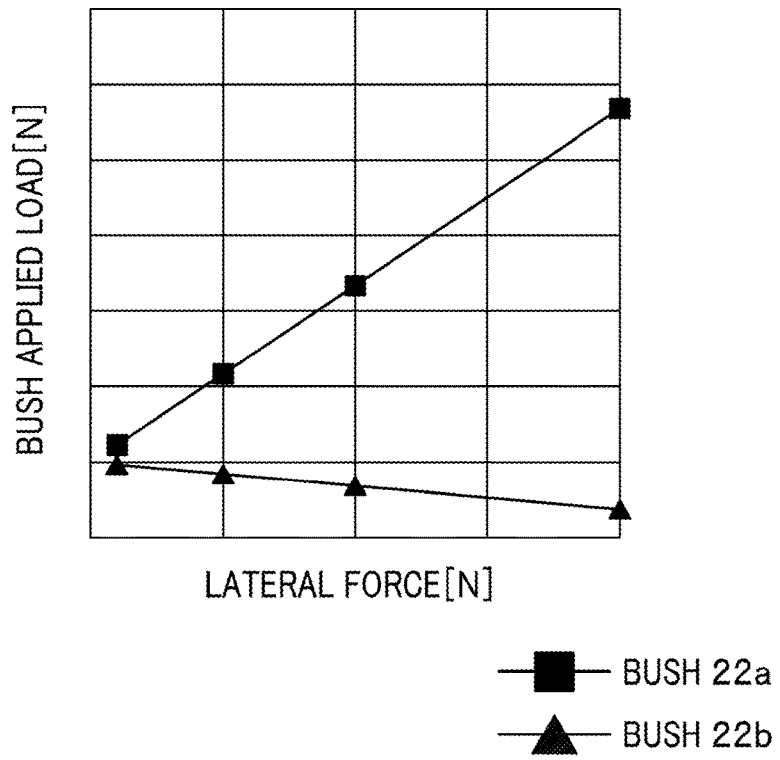
FIG. 6 is a graph in which a load applied to a bush on an upper side in a height direction and a load applied to a bush on a lower side in the height direction are compared.

FIG. 6 is a graph in which a load applied to the bush 22a on the upper side in the height direction and a load applied to the bush 22b on the lower side in the height direction are compared. The horizontal axis indicates a lateral force applied to the vibration damping device 10 and the vertical axis indicates a load applied to the bushes 22. A plot of a square indicates data of the bush 22a on the upper side and a plot of a triangle indicates data of the bush 22b on the lower side.

As it is seen from FIG. 6, a positive load is applied to the bush 22a on the upper side and a negative load is applied to the bush 22b on the lower side and the loads received by the upper and lower bushes are opposite. When load distributions in the bushes 22 were measured, whereas the load distribution of the bush 22a deviated to an edge portion on a side where a lateral force was applied, the load distribution of the bush 22b was uniform in the entire bush 22b. Accordingly, in the bush 22b on the lower side, since the load is less easily applied and the load is distributed, a risk of wear due to application of an excessive surface load to a part of the bush 22b is considered to be low.

From the above, when two or more bushes 22 are provided in the vibration damping device 10, it is possible to reduce the area of the frictional sliding surface in the bush 22 on the lower side where a load is less easily applied even if a lateral force is applied to the vibration damping device 10. By forming the bush 22 on the lower side smaller than the bush 22 on the upper side, it is possible to reduce a frictional force generated from the bushes 22 and reduce a frictional force generated from the bearing section 20.

As explained above, in the vibration damping device 10, when the plurality of bushes 22 are provided, it is desirable to set the area of the frictional sliding surface of the bush 22 on the lower side in the height direction smaller than the area of the frictional sliding surface of the bush 22 on the upper side in the height direction. With such a configuration, it is possible to reduce the frictional force generated from the bearing section 20 while stably holding the cylinder 11 with the plurality of bushes 22.

From the viewpoint of further reducing the frictional force, a configuration is also desirable in which the bush 22 on the lower side where a load is less easily applied is removed and only one bush 22 is disposed on the upper side of the bearing section 20 where a large load is applied and immediately below the oil seal 21a.

If a direction in which a lateral force is applied during use of the vibration damping device 10 is limited, a side where a surface load applied to the bush 22 by the lateral force increases is also limited. Accordingly, it is also desirable to form the bush 22 in an obliquely cut cylindrical shape such that the area of the frictional sliding surface on a side where the surface load of the bush 22 increases is large and the area of a frictional sliding surface on the opposite side is small.

Figure 8:
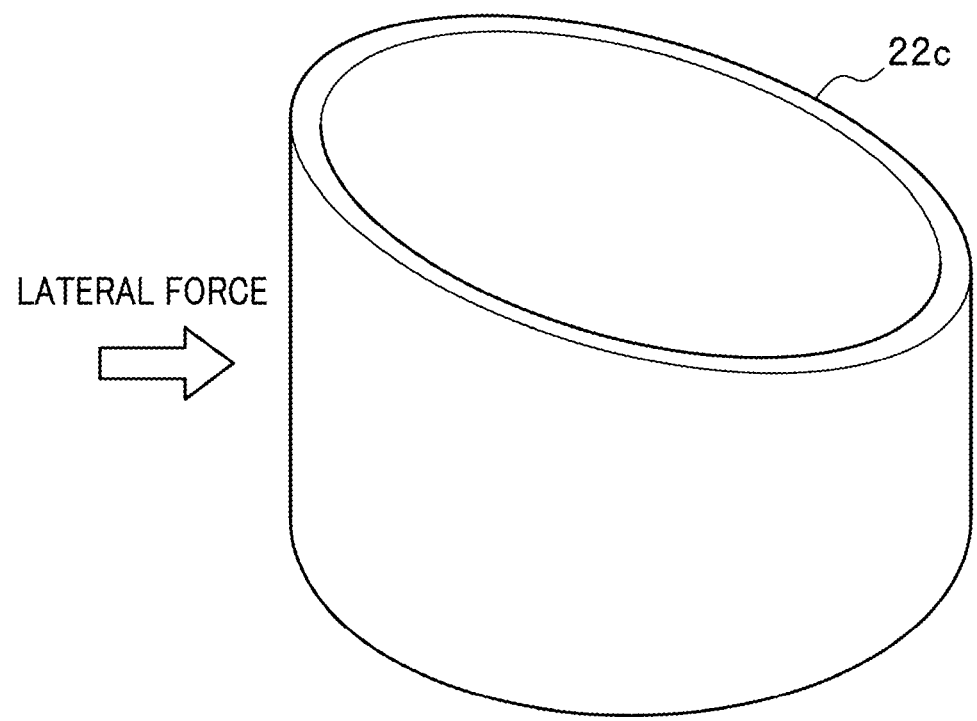

A schematic diagram of a bush 22c having an obliquely cut cylindrical shape, the height of which on a side where a lateral force is applied during the use of the vibration damping device 10 is larger than the height on the opposite side, is shown in FIG. 8. An arrow in FIG. 8 indicates a direction of the lateral force applied to the vibration damping device 10. That is, in the bush 22c, the height of a surface on a side where a large load is applied pointed by the arrow is larger than the height on the opposite side.

By setting the area of the frictional sliding surface on the surface load increasing side to be large as in the bush 22c, it is possible to secure rigidity necessary for the bush 22. On the other hand, by setting the area of the frictional sliding surface on the opposite side to be small, it is possible to reduce the surface load of the bush 22 and reduce the frictional force. A mechanism of the reduction of the frictional force is considered as explained below. Microscopic unevenness is present on the surface of an object. When the surfaces of two objects come into contact, what actually comes into contact is microscopic convex sections (true contact sections) of the surfaces of the objects. A frictional force in an micro region can be represented by a product of "shearing strength of a material configuring the objects" and "the area of the true contact section". Accordingly, if the area of the frictional sliding surface is reduced as in the bush 22c and the area of the true contact section is reduced, it is possible to reduce the frictional force generated in the micro region. It is surmised that the bush 22c reduces the frictional force in this way.

As explained above, when the bush 22 is formed in the obliquely cut cylindrical shape, the height of which on the side where the lateral force is applied is larger than the height on the opposite side, it is possible to achieve both of securing of necessary rigidity and a reduction of the frictional force. The obliquely cut cylindrical shape includes not only a strict obliquely cut cylinder but also a substantially obliquely cut cylinder.

EXAMPLES

Example 1

Example 1 is a vibration damping device of an inverted structure in which a bush containing 85 mass % of polytetrafluoroethylene and 15 mass % of perfluoro alkoxy alkane (PFA) is used as a bush and oil obtained by adding 1000 ppm of molybdenum dithiocarbamate (MoDTC) to the existing damper oil is used as lubricating oil.

The bush was formed in a substantially cylindrical shape. The inner diameter of the bush was 40 mm, the outer diameter of the bush was 44 mm, and the height of the bush was 20 mm. The distance between bushes of the vibration damping device was 115 mm.

Comparative Example 1

Comparative Example 1 is a vibration damping device of an inverted structure in which the existing bush containing 70 mass % of polytetrafluoroethylene (PTFE) and containing calcium fluoride ($CaF_2$) and ferric oxide ($Fe_2O_3$) as other components is used as a bush. Components other than the material of the bush are common to Example 1.

Comparative Example 2

Comparative Example 2 is a vibration damping device of an inverted structure in which the same existing bush as the existing bush in Comparative Example 1 is used as a bush and the existing damper oil is used as lubricating oil. Components other than the lubricating oil and the material of the bush are common to the first embodiment.

Concerning Example 1 and Comparative Examples 1 and 2, a frequency was set to 0.005 Hz and amplitude was set to ±5 mm. A damper unit test was performed under four conditions of laterals forces of 0 N, 300 N, 500 N, and 700 N. A result of the damper unit test is explained below.

Figure 7:
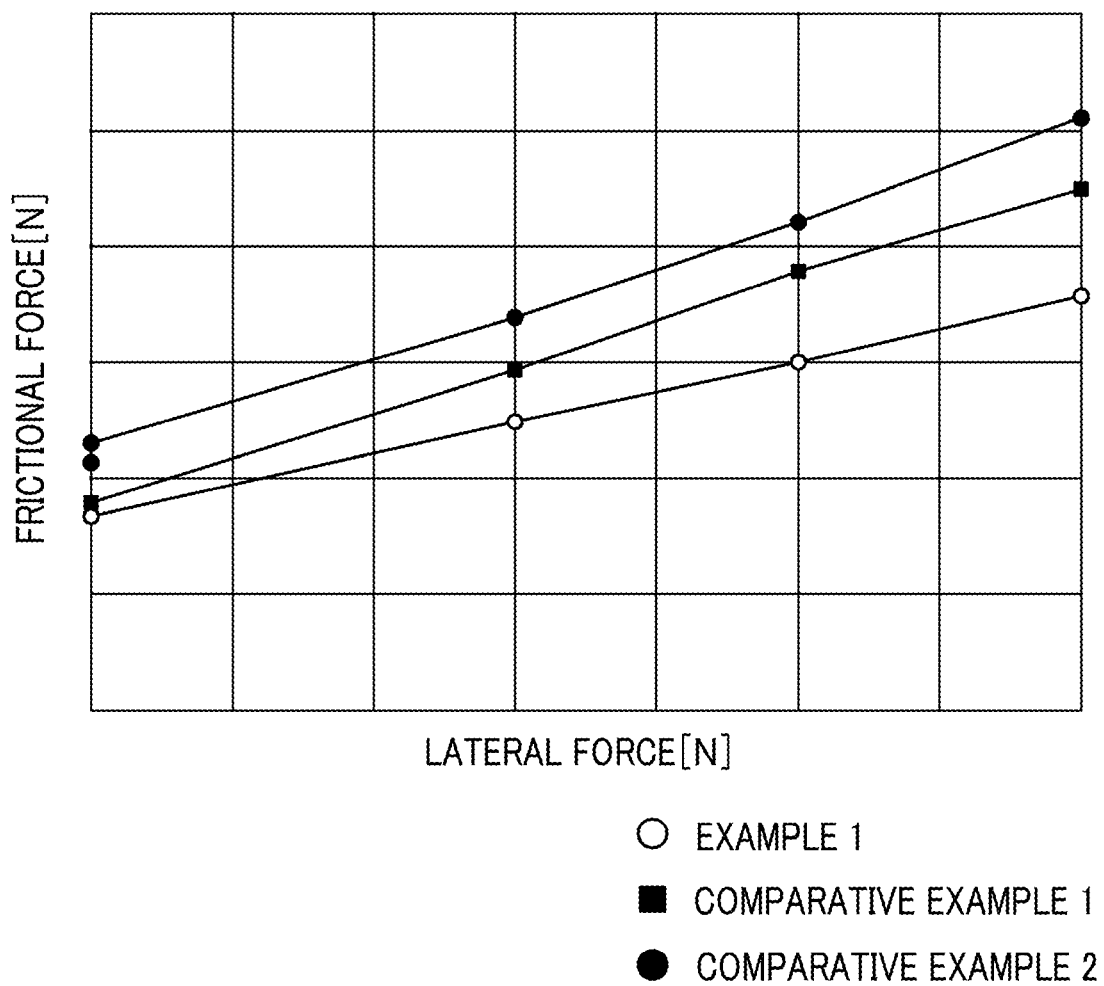
FIG. 7 is a graph showing relations between lateral forces and frictional forces applied to vibration damping devices in Example and Comparative Examples and FIG. 8 is a schematic diagram of a bush having an obliquely cut cylindrical shape, the height of which on a side where a lateral force is applied during use of the vibration damping device is larger than the height on the opposite side to the side.

FIG. 7 is a graph showing relations between lateral forces and frictional forces applied to the vibration damping devices in Example and Comparative Examples. A plot of a white circle is measurement data of Example 1, a plot of a black square is data of Comparative Example 1, and a plot of a black circle is data of Comparative Example 2.

In Example 1, the frictional force is reduced under all lateral forces in a measurement range.

Comparative Example 1 is an example in which the improved bush in Example 1 is replaced with the existing bush. In Comparative Example 1, a frictional force higher than the frictional force in Example 1 is generated under all the lateral forces. The frictional force is markedly increased in particular under a high lateral force among the lateral forces.

Comparative Example 2 is an example in which the improved bush in Example 1 is replaced with the existing bush and the oil added with the organic molybdenum additive is replaced with oil not added with the organic molybdenum additive. In Comparative Example 2, a frictional force higher than the frictional force in Comparative Example 1 is generated under all the lateral forces. When Comparative Example 2 and Comparative Example 1 are compared, an increase in the frictional force under the high lateral force is not so confirmed as in the comparison of Comparative Example 1 and Example 1.

From the above, it can be confirmed that both of the improved bush and the organic molybdenum additive exert an effect of a frictional force reduction and the improved bush exerts the effect in the frictional force reduction, in particular, under a high lateral force.

What is claimed is:

1. A vibration damping device of an inverted structure comprising:
   a cylinder;
   a rod capable of protruding and retracting in the cylinder;
   an outer cylinder coupled to the rod and inserted over an outer periphery of the cylinder; and
   a bush slidably inserted between the outer cylinder and the cylinder,
   wherein
   a gap between the outer cylinder and the cylinder is filled with lubricating oil,
   the bush contains polytetrafluoroethylene and perfluoro alkoxy alkane,
   the lubricating oil contains an organic molybdenum additive,
   the bush has an obliquely cut cylindrical shape with a height on a side where a lateral force is applied during use of the vibration damping device being larger than a height on an opposite side to the side.

2. The vibration damping device of the inverted structure according to claim 1, wherein the lubricating oil contains 700 to 2000 ppm of the organic molybdenum additive.

3. The vibration damping device of the inverted structure according to claim 1, further comprising:
   a second bush that: is slidably inserted between the outer cylinder and the cylinder; contains polytetrafluoroethylene and perfluoro alkoxy alkane; has an obliquely cut cylindrical shape with a height on the side where the lateral force is applied during use of the vibration damping device being larger than a height on the opposite side to the side; and is present on an upper side in a height direction, wherein
   the bush is present on a lower side in the height direction, and
   an area of a frictional sliding surface of the bush present on the lower side in the height direction is smaller than an area of a frictional sliding surface of the second bush present on the upper side in the height direction.

\* \* \* \* \*